US00RE43445E

(19) United States
(12) Reissued Patent
Wood, Jr. et al.

(10) Patent Number: US RE43,445 E
(45) Date of Reissued Patent: Jun. 5, 2012

(54) METHOD AND APPARATUS TO MANAGE RFID TAGS

(75) Inventors: Clifton W. Wood, Jr., Tulsa, OK (US); Don Hush, Los Alamos, NM (US)

(73) Assignee: Round Rock Research, LLC, Mount Kisco, NY (US)

(21) Appl. No.: 11/865,584

(22) Filed: Oct. 1, 2007
(Under 37 CFR 1.47)

Related U.S. Patent Documents

Reissue of:
(64) Patent No.: 6,307,848
Issued: Oct. 23, 2001
Appl. No.: 09/773,461
Filed: Jan. 31, 2001

U.S. Applications:
(63) Continuation of application No. 10/693,697, filed on Oct. 23, 2003, now Pat. No. Re. 42,344, which is a continuation of application No. 09/551,304, filed on Apr. 18, 2000, now Pat. No. 6,226,300, which is a continuation of application No. 09/026,045, filed on Feb. 19, 1998, now Pat. No. 6,072,801.

(51) Int. Cl.
*H04L 12/56* (2006.01)
*H04J 1/16* (2006.01)

(52) U.S. Cl. ..... 370/437; 370/329; 370/462; 340/10.1

(58) Field of Classification Search ..... 370/252, 370/329, 254–258, 437, 462; 340/825.08, 340/10.1
See application file for complete search history.

(56) References Cited

U.S. PATENT DOCUMENTS
4,075,632 A 2/1978 Baldwin et al.
(Continued)

FOREIGN PATENT DOCUMENTS
EP 779520 9/1997
(Continued)

OTHER PUBLICATIONS
USPTO Transaction History of U.S. Appl. No. 09/026,043, filed Feb. 19, 1998, entitled "Method of Addressing Messages and Communications System," now U.S. Patent No. 6,118,789.
(Continued)

*Primary Examiner* — John Pezzlo
(74) *Attorney, Agent, or Firm* — Gazdzinski & Associates, PC

(57) ABSTRACT

A method of establishing wireless communications between an interrogator and individual ones of multiple wireless identification devices[, the method comprising utilizing a tree search method to establish communications without collision between the interrogator and individual ones of the multiple wireless identification devices, a search tree being defined for the tree search method, the tree having multiple levels representing subgroups of the multiple wireless identification devices, the number of devices in a subgroup in one level being half of the number of devices in the next higher level, the tree search method employing level skipping wherein at least one level of the tree is skipped. A communications system comprising an interrogator, and a plurality of wireless identification devices configured to communicate with the interrogator in a wireless fashion, the respective wireless identification devices having a unique identification number, the interrogator being configured to employ a tree search technique to determine the unique identification numbers of the different wireless identification devices so as to be able to establish communications between the interrogator and individual ones of the multiple wireless identification devices without collision by multiple wireless identification devices attempting to respond to the interrogator at the same time, wherein levels of the tree are occasionally skipped]. *In one aspect, a method includes: transmitting by an interrogator a first wireless signal, specifying a first set of bit values, to request first replies from radio frequency identification (RFID) devices that have the first set of bit values; and responsive to a collision in the first replies, transmitting by the interrogator a second wireless signal, specifying a second set of bit values having at least two more bits than the first set, to request second replies from RFID devices that have the second set of bit values.*

66 Claims, 3 Drawing Sheets

U.S. PATENT DOCUMENTS 4,761,778 A 8/1988 Hui
4,796,023 A 1/1989 King
4,799,059 A 1/1989 Grindahl et al.
4,845,504 A 7/1989 Roberts et al.
4,862,453 A 8/1989 West et al.
4,926,182 A 5/1990 Ohta et al.
4,955,018 A 9/1990 Twitty et al.
4,969,146 A 11/1990 Twitty et al.
5,019,813 A 5/1991 Kip et al.
5,025,486 A 6/1991 Klughart
5,046,066 A 9/1991 Messenger
5,055,968 A 10/1991 Nishi et al.
5,121,407 A 6/1992 Partyka et al.
5,124,697 A 6/1992 Moore
5,142,694 A 8/1992 Jackson et al.
5,144,313 A 9/1992 Kirknes
5,144,668 A 9/1992 Malek et al.
5,150,114 A 9/1992 Johansson
5,150,310 A 9/1992 Greenspun et al.
5,164,985 A 11/1992 Nysen et al.
5,168,510 A 12/1992 Hill
5,194,860 A 3/1993 Jones et al.
5,231,646 A 7/1993 Heath et al.
5,266,925 A 11/1993 Vercellotti et al.
5,307,463 A 4/1994 Hyatt et al.
5,365,551 A 11/1994 Sondgrass et al.
5,373,503 A 12/1994 Chen
5,449,296 A 9/1995 Jacobsen et al.
5,461,627 A 10/1995 Rypinski
5,479,416 A 12/1995 Snodgrass et al.
5,500,650 A 3/1996 Snodgrass et al.
5,530,702 A 6/1996 Palmer et al.
5,550,547 A 8/1996 Chan et al.
5,583,850 A 12/1996 Snodgrass et al.
5,608,739 A 3/1997 Snodgrass et al.
5,619,648 A 4/1997 Canale et al.
5,621,412 A 4/1997 Sharpe et al.
5,625,628 A 4/1997 Heath
5,627,544 A 5/1997 Snodgrass et al.
5,640,151 A 6/1997 Reis et al.
5,649,296 A 7/1997 MacLellan et al.
5,686,902 A 11/1997 Reis et al.
5,790,946 A 8/1998 Rotzoll
5,805,586 A 9/1998 Perreault et al.
5,841,770 A * 11/1998 Snodgrass et al. ..... 370/346
5,914,671 A 6/1999 Tuttle
5,936,560 A 8/1999 Higuchi
5,940,006 A 8/1999 MacLellan et al.
5,942,987 A 8/1999 Heinrich et al.
5,952,922 A 9/1999 Shober
5,966,471 A 10/1999 Fisher et al.
5,974,078 A 10/1999 Tuttle et al.
5,988,510 A 11/1999 Tuttle et al.
5,999,091 A * 12/1999 Wortham ..... 340/431
6,038,455 A 3/2000 Gardner et al.
6,061,344 A 5/2000 Wood, Jr.
6,072,801 A 6/2000 Wood, Jr. et al.
6,075,973 A 6/2000 Greeff et al.
6,097,292 A 8/2000 Kelly et al.
6,104,333 A 8/2000 Wood, Jr.
6,118,789 A 9/2000 Wood, Jr.
6,130,602 A 10/2000 O'Toole et al.
6,130,623 A 10/2000 MacLellan et al.
6,150,921 A 11/2000 Werb et al.
6,157,633 A 12/2000 Wright
6,169,474 B1 1/2001 Greeff et al.
6,177,858 B1 1/2001 Raimbault et al.
6,185,307 B1 2/2001 Johnson, Jr.
6,192,222 B1 2/2001 Greeff et al.
6,216,132 B1 4/2001 Chandra et al.
6,226,300 B1 5/2001 Hush et al.
6,229,987 B1 5/2001 Greeff et al.
6,243,012 B1 6/2001 Shober et al.
6,265,962 B1 7/2001 Black et al.
6,265,963 B1 7/2001 Wood, Jr.
6,275,476 B1 8/2001 Wood, Jr.
6,282,186 B1 8/2001 Wood, Jr.
6,288,629 B1 9/2001 Cofino et al.
6,289,209 B1 9/2001 Wood, Jr.
6,307,847 B1 10/2001 Wood, Jr.
6,307,848 B1 10/2001 Wood, Jr. et al.
6,324,211 B1 11/2001 Ovard et al.
6,415,439 B1 7/2002 Randell et al.
6,459,726 B1 10/2002 Ovard et al.
6,483,427 B1 11/2002 Werb
6,566,997 B1 5/2003 Bradin
6,570,487 B1 5/2003 Steeves
6,707,376 B1 3/2004 Patterson et al.
6,714,559 B1 3/2004 Meier
6,771,634 B1 8/2004 Wright
6,778,096 B1 8/2004 Ward et al.
6,784,787 B1 8/2004 Atkins
6,812,824 B1 * 11/2004 Goldinger et al. ..... 340/10.1
6,850,510 B2 2/2005 Kubler et al.
6,919,793 B2 7/2005 Heinrich et al.
7,026,935 B2 4/2006 Diorio et al.
7,315,522 B2 1/2008 Wood, Jr.
7,385,477 B2 6/2008 O'Toole et al.
7,672,260 B2 3/2010 Wood, Jr.
2003/0235184 A1 12/2003 Dorenbosch
2005/0060069 A1 3/2005 Breed et al.
2005/0207364 A1 9/2005 Wood, Jr.
2006/0022800 A1 2/2006 Krishna et al.
2006/0022801 A1 2/2006 Husak et al.
2006/0022815 A1 2/2006 Fischer
2006/0056325 A1 3/2006 Wood, Jr.
2006/0208169 A1 * 9/2006 Breed et al. ..... 250/221
2006/0209781 A1 9/2006 Wood, Jr.
2007/0139164 A1 6/2007 O'Toole et al.
2007/0176751 A1 8/2007 Cesar et al.
2008/0007412 A1 1/2008 Wood, Jr.
2008/0042806 A1 2/2008 Wood, Jr.
2008/0048832 A1 2/2008 O'Toole et al.
2008/0048835 A1 2/2008 O'Toole et al.
2008/0129485 A1 6/2008 Tuttle
2008/0180221 A1 7/2008 Tuttle
2009/0322491 A1 12/2009 Wood, Jr.

FOREIGN PATENT DOCUMENTS

EP 1072128 5/2008
JP 9054213 2/1997
JP 2002228809 8/2002
WO 9748216 12/1997
WO WO 97/48216 12/1997 ..... 12/56
WO 9943127 8/1999
WO 2008094728 8/2008

OTHER PUBLICATIONS

USPTO Transaction History of U.S. Appl. No. 09/026,045, filed Feb. 19, 1998, entitled "Method of Addressing Messages, Methods of Establishing Wireless Communications, and Communications System," now U.S. Patent No. 6,072,801.

USPTO Transaction History of U.S. Appl. No. 09/026,050, filed Feb. 19, 1998, entitled "Method of Addressing Messages and Communications System," now U.S. Patent No. 6,061,344.

USPTO Transaction History of U.S. Appl. No. 09/026,248, filed Feb. 19, 1998, entitled "Method of Addressing Messages and Communications System," now U.S. Patent No. 6,275,476.

USPTO Transaction History of U.S. Appl. No. 09/551,304, filed Apr. 18, 2000, entitled "Method of Addressing Messages and Communications Systems," now U.S. Patent No. 6,282,186.

USPTO Transaction History of U.S. Appl. No. 09/556,235, filed Apr. 18, 2000, entitled "Method of Addressing Messages, and Establishing Communications Using a Tree Search Technique That Skips Levels," now U.S. Patent No. 6,226,300.

USPTO Transaction History of U.S. Appl. No. 09/617,390, filed Jul. 17, 2000, entitled "Method of Addressing Messages and Communications System," now U.S. Patent No. 6,307,847.

USPTO Transaction History of U.S. Appl. No. 09/773,461, filed Jan. 31, 2001, entitled "Method of Addressing Messages, Methods of Establishing Wireless Communications, and Communications System," now U.S. Patent No. 6,307,848.

USPTO Transaction History of U.S. Appl. No. 09/820,467, filed Mar. 28, 2001, entitled "Method of Addressing Messages and Communications System," now U.S. Patent No. 7,315,522.
USPTO Transaction History of U.S. Appl. No. 10/652,573, filed Aug. 28, 2003, entitled "Method of Addressing Messages and Communications System."
USPTO Transaction History of U.S. Appl. No. 10/693,696, filed Oct. 23, 2003, entitled "Method and Apparatus to Select Radio Frequency Identification Devices in Accordance with an Arbitration Scheme."
USPTO Transaction History of U.S. Appl. No. 10/693,697, filed Oct. 23, 2003, entitled "Method of Addressing Messages, Methods of Establishing Wireless Communications, and Communications System."
USPTO Transaction History of U.S. Appl. No. 11/143,395, filed Jun. 1, 2005, entitled "Method of Addressing Messages and Communications System."
USPTO Transaction History of U.S. Appl. No. 11/270,204, filed Nov. 8, 2005, entitled "Method of Addressing Messages and Communications System."
USPTO Transaction History of U.S. Appl. No. 11/416,846, filed May 2, 2006, entitled "Method of Addressing Messages and Communications System."
USPTO Transaction History of U.S. Appl. No. 11/855,855, filed Sep. 14, 2007, entitled "Method of Addressing Messages and Communications System."
USPTO Transaction History of U.S. Appl. No. 11/855,860, filed Sep. 14, 2007, entitled "Method of Addressing Messages and Communications System."
USPTO Transaction History of U.S. Appl. No. 11/859,360, filed Sep. 21, 2007, entitled "Method of Addressing Messages and Communications System."
USPTO Transaction History of U.S. Appl. No. 11/859,364, filed Sep. 21, 2007, entitled "Method of Addressing Messages and Communications System."
USPTO Transaction History of U.S. Appl. No. 11/862,121, filed Sep. 26, 2007, entitled "Method of Addressing Messages and Communications System."
USPTO Transaction History of U.S. Appl. No. 11/862,124, filed Sep. 26, 2007, entitled "Method of Addressing Messages and Communications."
USPTO Transaction History of U.S. Appl. No. 11/862,130, filed Sep. 26, 2007, entitled "Method of Addressing Messages and Communications System."
USPTO Transaction History of U.S. Appl. No. 11/865,580, filed Oct. 1, 2007, entitled "Method of Addressing Messages, Methods of Establishing Wireless Communications, and Communications System."
Auto-ID Center, Massachusetts Institute of Technology, "13.56 MHz ISM Band Class 1 Radio Frequency Identification Tag Interface Specification: Recommended Standard," Technical Report, Feb. 1, 2003.
Capetanakis, John I., "Generalized TDMA: The Multi-Accessing Tree Protocol," IEEE Transactions on Information Theory, Vol. Com. 27, No. 10, pp. 1476-1484, Oct. 1979.
Capetanakis, John I., "Tree Algorithms for Packet Broadcast Channels", IEEE Transactions on Information Theory, Vol. IT-25, No. 5, pp. 505-515, Sep. 1979.
CNN Money, "Manhattan Associates Announces Next-Generation Microsoft-Based RFID Solutions," located at http://money.cnn.com/services/tickerheadlines/prn/cltu045.PI.09162003122727.24911.htm, Sep. 16, 2003.
Engels, Daniel, "The Use of the Electronic Product Code," Auto-ID Center, Massachusetts Institute of Technology, Technical Report, Feb. 1, 2003.
EPC Global, Inc. "EPC Radio Frequency Identity Protocols—Class-1 Generation-2 UHF RFID—Protocol for Communications at 860 MHz-960MHz," version 1.0.9, cover sheet and pp. 37-38, Jan. 2005.
eRetailNews, "The Electronic Product Code (EPC)—A Technology Revolution?" located at http://www.eretailnews.com/features/0105epc1.htm, accessed Oct. 15, 2003.
eRetailNews, "The Electronic Product Code (EPC)," located at http://www.eretailnews.com/features/epc/htm, accessed Oct. 15, 2003.
eRetailNews, "The Electronic Product Code Schematic," located at http://eee.eretailnews.com/features/0105epcschema.htm, accessed Oct. 15, 2003.
Extended Search Report and Search Opinion for EP Patent Application No. 05016513.3, Jan. 22, 2007.
Extended Search Report and Search Opinion for EP Patent Application No. 05016514.1, Jan. 26, 2007.
High Tech Aid, "ISO/IEC 18000—RFID Air Interface Standards," located at http://www.hightechaid.com/standards/18000.htm, Feb. 1, 2003.
Humblet, Pierre A. et al., "Efficient Accessing of a Multiaccess Channel," Proceedings of the 19th IEEE Conference on Decision and Control including the Symposium on Adaptive Processes, pp. 624-627, 1980.
ISO/IEC, "Automatic Identification—Radio Frequency Identification for Item Management—Communications and Interfaces—Part 3: Physical Layer, Anti Collision System and Protocol Values at 13.56 MHz Mode 4," ISO/IEC 18000-3-4, Mar. 1, 2001.
ISO/IEC, "Automatic Identification—Radio Frequency Identification for Item Management—Communications and Interfaces—Part 3: Physical Layer, Anti-Collision System and Protocol Values at 13.56 MHz Mode 1," ISO/IEC 18000-3-1, Mar. 1, 2001.
ISO/IEC, "Identification Cards—Contactless Integrated Circuit(s) Cards—Proximity Cards—Part 1: Physical Characteristics," ISO/IEC FCD 14443-1, 1997.
ISO/IEC, "Identification Cards—Contactless Integrated Circuit(s) Cards—Proximity Cards—Part 2: Radio Frequency Power and Signal Interface," ISO/IEC FCD 14443-2, Mar. 26, 1999.
ISO/IEC, "Identification Cards—Contactless Integrated Circuit(s) Cards—Proximity Cards—Part 3: Initiation and Anticollision," ISO/IEC FDIS 14443-3:2000(E), Jul. 13, 2000.
ISO/IEC, "Identification Cards—Contactless Integrated Circuit(s) Cards—Proximity Cards—Part 4: Transmission Protocol," ISO/IEC FDIS 14443-4:2000(E), Jul. 13, 2000.
ISO/IEC, "Identification Cards—Contactless Integrated Circuit(s) Cards—Vicinity Cards—Part 1: Physical Characteristics," ISO/IEC FDIS 15693-1:2000(E), May 19, 2000.
ISO/IEC, "Identification Cards—Contactless Integrated Circuit(s) Cards—Vicinity Cards—Part 2: Interface and Initialization," ISO/IEC FDIS 15693-2:2000(E), Feb. 3, 2000.
ISO/IEC, "Identification Cards—Contactless Integrated Circuit(s) Cards—Vicinity Cards—Part 3: Anitcollision and Transmission Protocol," ISO/IEC CD 15693-3:1999(E), Nov. 17, 1999.
ISO/IEC, "Information Technology AIDC Techniques—RFID for Item Management—Air Interface—Part 3: Paramenters for Air Interface Communications at 13.56 MHz," ISO/IEC 18000-3 FCD, May 27, 2002.
Mullin, Eileen, "Electronic Product Code," Baseline Magazine, located at www.baselinemag.com/article2/0,3959,655991,00.asp, Sep. 5, 2002.
RFID Journal, "Second Source of Class 1 EPC Chips," located at http://www.rfidjournal.com/article/articleview/473/1/1/, Jun. 26, 2003.
Wolf, Jack Keil, "Principles of Group Testing and an Application to the Design and Analysis of Multi-Access Protocols," NaTO ASI Series E, Applied Sciences, No. 91, pp. 237-257, 1985.
Zebra Technologies Corporation, "Electronic Product Code (EPC)," located at http://www.rfid.zebra.com/epc/htm, accessed Oct. 15, 2003.
Finkenzeller, Klaus, "Radio Frequency ldenitifcation—The Authors Homepage of the RFID Handbook," located at http://www.rfid-handbook.com, accessed Feb. 22, 2007.
Smart Active Labels Consortium, organization homepage located at http://www.sal-c.org, accessed Feb. 22, 2007.
Symbol Technologies, Inc., "Understanding Gen 2: What It Is, How You Will Benefit and Criteria for Vendor Assessment," white paper, Jan. 2006.
Wright, Jim, "Trends and Innovations in RF Indentification," Sun Microsystems Inc. presentation, Mar. 2005.
Wood, Jr., Clifton W., U.S. Appl. No. 11/865,580, filed Oct. 1, 2007.
Wood, Jr., Clifton W., U.S. Appl. No. 10/652,573, filed Aug. 28, 2008.
Wood, Jr., Clifton W., U.S. Appl. No. 11/862,121, filed Sep. 26, 2007.

International Application No. PCT/US08/50630, Written Opinion, Jun. 27, 2008.
International Application No. PCT/US08/50630, International Search Report, Jun. 27, 2008.
Tuttle, John R., U.S. Appl. No. 11/755,073 entitled "Methods and Systems of Receiving Data Payload of RFID Tags," filed May 30, 2007.
International Application No. PCT/US99/02288, Written Opinion, Jan. 27, 2000.
Wood, Jr., Clifton W., U.S. Appl. No. 10/693,696, filed Oct. 23, 2003.
International Application No. PCT/US99/02288, International Search Report, Aug. 3, 1999.
Wood, Jr., Clifton W., U.S. Appl. No. 11/859,360, filed Sep. 21, 2007.
Wood, Jr., Clifton W., U.S. Appl. No. 11/859,364, filed Sep. 21, 2007.
Wood, Jr., Clifton W., U.S. Appl. No. 11/862,124, filed Sep. 26, 2007.
Wood, Jr., Clifton W., U.S. Appl. No. 11/862,130, filed Sep. 21, 2007.
Wood, Jr., Clifton W., U.S. Appl. No. 10/693,697, filed Oct. 23, 2003.
Transaction History of related U.S. Appl. No. 09/026,043, filed Feb. 19, 1998, entitled "Method of Addressing Messages and Communications System," now U.S. Patent No. 6,118,789.
Transaction History of related U.S. Appl. No. 09/026,045, filed Feb. 19, 1998, entitled "Method of Addressing Messages, Methods of Establishing Wireless Communications, and Communications System," now U.S. Patent No. 6,072,801.
Transaction History of related U.S. Appl. No. 09/026,050, filed Feb. 19, 1998, entitled "Method of Addressing Messages and Communications System," now U.S. Patent No. 6,061,344.
Transaction History of related U.S. Appl. No. 09/026,248, filed Feb. 19, 1998, entitled "Method of Addressing Messages and Communications System," now U.S. Patent No. 6,275,476.
Transaction History of related U.S. Appl. No. 09/551,304, filed Apr. 18, 2000, entitled "Method of Addressing Messages and Communications Systems," now U.S. Patent No. 6,282,186.
Transaction History of related U.S. Appl. No. 09/556,235, filed Apr. 18, 2000, entitled "Method of Addressing Messages, and Establishing Communications Using a Tree Search Technique That Skips Levels," now U.S. Patent No. 6,226,300.
Transaction History of related U.S. Appl. No. 09/617,390, filed Jul. 17, 2000, entitled "Method of Addressing Messages and Communications System," now U.S. Patent No. 6,307,847.
Transaction History of related U.S. Appl. No. 09/773,461, filed Jan. 31, 2001, entitled "Method of Addressing Messages, Methods of Establishing Wireless Communications, and Communications System," now U.S. Patent No. 6,307,848.
Transaction History of related U.S. Appl. No. 09/820,467, filed Mar. 28, 2001, entitled "Method of Addressing Messages and Communications System," now U.S. Patent No. 7,315,522.
Transaction History of related Transaction History of related U.S. Appl. No. 10/652,573, filed Aug. 28, 2003, entitled "Method of Addressing Messages and Communications System."
Transaction History of related U.S. Appl. No. 10/693,696, filed Oct. 23, 2003, entitled "Method and Apparatus to Select Radio Frequency Identification Devices in Accordance with an Arbitration Scheme."
Transaction History of related U.S. Appl. No. 10/693,697, filed Oct. 23, 2003, entitled "Method of Addressing Messages, Methods of Establishing Wireless Communications, and Communications System."
Transaction History of related U.S. Appl. No. 11/143,395, filed Jun. 1, 2005, entitled "Method of Addressing Messages and Communications System."
Transaction History of related U.S. Appl. No. 11/270,204, filed Nov. 8, 2005, entitled "Method of Addressing Messages and Communications System."
Transaction History of related U.S. Appl. No. 11/416,846, filed May 2, 2006, entitled "Method of Addressing Messages and Communications System."
Transaction History of related U.S. Appl. No. 11/700,525, filed Jan. 30, 2007, entitled "Systems and Methods for RFID Tag Arbitration."
Transaction History of related U.S. Appl. No. 11/755,073, filed May 30, 2007, entitled "Methods and Systems of Receiving Data Payload of RFID Tags."
Transaction History of related U.S. Appl. No. 11/855,855, filed Sep. 14, 2007, entitled "Method of Addressing Messages and Communications System."
Transaction History of related U.S. Appl. No. 11/855,860, filed Sep. 14, 2007, entitled "Method of Addressing Messages and Communications System."
Transaction History of related U.S. Appl. No. 11/859,360, filed Sep. 21, 2007, entitled "Method of Addressing Messages and Communications System."
Transaction History of related U.S. Appl. No. 11/859,364, filed Sep. 21, 2007, entitled "Method of Addressing Messages and Communications System."
Transaction History of related U.S. Appl. No. 11/862,121, filed Sep. 26, 2007, entitled "Method of Addressing Messages and Communications System."
Transaction History of related U.S. Appl. No. 11/862,124, filed Sep. 26, 2007, entitled "Method of Addressing Messages and Communications."
Transaction History of related U.S. Appl. No. 11/862,130, filed Sep. 26, 2007, entitled "Method of Addressing Messages and Communications System."
Transaction History of related U.S. Appl. No. 11/865,580, filed Oct. 1, 2007, entitled "Method of Addressing Messages, Methods of Establishing Wireless Communications, and Communications System."
Wood, Jr., Clifton W., U.S. Appl. No. 12/541,882, filed Aug. 14, 2009.

* cited by examiner

METHOD AND APPARATUS TO MANAGE RFID TAGS

Matter enclosed in heavy brackets [ ] appears in the original patent but forms no part of this reissue specification; matter printed in italics indicates the additions made by reissue.

CROSS REFERENCE TO RELATED APPLICATION

[This] *More than one reissue application has been filed for the reissue of U.S. Pat. No. 6,307,848. The reissue applications are the initial reissue application Ser. No. 10/693,697 filed Oct. 23, 2003, a continuation reissue application Ser. No. 11/865,580 filed Oct. 1, 2007, and the present application, which* is a [Continuation] *continuation application of reissue application Ser. No. 10/693,697, filed Oct. 23, 2003, which is a reissue application of U.S. patent application Ser. No. 09/773,461, filed Jan. 31, 2001 and now U.S. Pat. No. 6,307,848, which is a continuation application* of U.S. patent application Ser. No. 09/551,304, filed Apr. 18, 2000, [and] titled "Method of Addressing Messages, and Establishing Communications Using a Tree Search Technique That Skips Levels" *and now U.S. Pat. No. 6,226,300*, which in turn is a continuation of U.S. patent application Ser. No. 09/026,045, filed Feb. 19, 1998, which is now U.S. Pat. No. 6,072,801.

TECHNICAL FIELD

This invention relates to communications protocols and to digital data communications. Still more particularly, the invention relates to data communications protocols in mediums such as radio communication or the like. The invention also relates to radio frequency identification devices for inventory control, object monitoring, determining the existence, location or movement of objects, or for remote automated payment.

BACKGROUND OF THE INVENTION

Communications protocols are used in various applications. For example, communications protocols can be used in electronic identification systems. As large numbers of objects are moved in inventory, product manufacturing, and merchandising operations, there is a continuous challenge to accurately monitor the location and flow of objects. Additionally, there is a continuing goal to interrogate the location of objects in an inexpensive and streamlined manner. One way of tracking objects is with an electronic identification system.

One presently available electronic identification system utilizes a magnetic coupling system. In some cases, an identification device may be provided with a unique identification code in order to distinguish between a number of different devices. Typically, the devices are entirely passive (have no power supply), which results in a small and portable package. However, such identification systems are only capable of operation over a relatively short range, limited by the size of a magnetic field used to supply power to the devices and to communicate with the devices.

Another wireless electronic identification system utilizes a large active transponder device affixed to an object to be monitored which receives a signal from an interrogator The device receives the signal, then generates and transmits a responsive signal. The interrogation signal and the responsive signal are typically radio-frequency (RF) signals produced by an RF transmitter circuit. Because active devices have their own power sources, and do not need to be in close proximity to an interrogator or reader to receive power via magnetic coupling. Therefore, active transponder devices tend to be more suitable for applications requiring tracking of a tagged device that may not be in close proximity to an interrogator. For example, active transponder devices tend to be more suitable for inventory control or tracking.

Electronic identification systems can also be used for remote payment. For example, when a radio frequency identification device passes an interrogator at a toll booth, the toll booth can determine the identity of the radio frequency identification device, and thus of the owner of the device, and debit an account held by the owner for payment of toll or can receive a credit card number against which the toll can be charged. Similarly, remote payment is possible for a variety of other goods or services.

A communication system typically includes two transponders: a commander station or interrogator, and a responder station or transponder device which replies to the interrogator.

If the interrogator has prior knowledge of the identification number of a device which the interrogator is looking for, it can specify that a response is requested only from the device with that identification number. Sometimes, such information is not available. For example, there are occasions where the interrogator is attempting to determine which of multiple devices are within communication range.

When the interrogator sends a message to a transponder device requesting a reply, there is a possibility that multiple transponder devices will attempt to respond simultaneously, causing a collision, and thus causing an erroneous message to be received by the interrogator. For example, if the interrogator sends out a command requesting that all devices within a communications range identify themselves, and gets a large number of simultaneous replies, the interrogator may not be able to interpret any of these replies. Thus, arbitration schemes are employed to permit communications free of collisions.

In one arbitration scheme or system, described in commonly assigned U.S. Pat. Nos. 5,627,544; 5,583,850; 5,500,650; and 5,365,551, all to Snodgrass et al. and all incorporated herein by reference, the interrogator sends a command causing each device of a potentially large number of responding devices to select a random number from a known range and use it as that device's arbitration number. By transmitting requests for identification to various subsets of the full range of arbitration numbers, and checking for an error-free response, the interrogator determines the arbitration number of every responder station capable of communicating at the same time. Therefore, the interrogator is able to conduct subsequent uninterrupted communication with devices, one at a time, by addressing only one device.

Another arbitration scheme is referred to as the Aloha or slotted Aloha scheme. This scheme is discussed in various references relating to communications, such as Digital Communications: Fundamentals and Applications, Bernard Sklar, published January 1988 by Prentice Hall. In this type of scheme, a device will respond to an interrogator using one of many time domain slots selected randomly by the device. A problem with the Aloha scheme is that if there are many devices, or potentially many devices in the field (i.e. in communications range, capable of responding) then there must be many available slots or many collisions will occur. Having many available slots slows down replies. If the magnitude of the number of devices in a field is unknown, then many slots are needed. This results in the system slowing down significantly because the reply time equals the number of slots multiplied by the time period required for one reply.

An electronic identification system which can be used as a radio frequency identification device, arbitration schemes, and various applications for such devices are described in detail in commonly assigned U.S. patent application Ser. No. 08/705,043, filed Aug. 29, 1996, [and] *now U.S. Pat. No. 6,130,602 which is*, incorporated herein by reference.

SUMMARY OF THE INVENTION

The invention provides a wireless identification device configured to provide a signal to identify the device in response to an interrogation signal.

*One aspect of the invention provides a method including: transmitting by an interrogator a first wireless signal, specifying a first set of bit values, to request first replies from radio frequency identification (RFID) devices that have the first set of bit values; and responsive to a collison in the first replies, transmitting by the interrogator a second wireless signal, specifying a second set of bit values having at least two more bits than the first set, to request second replies from RFID devices that have the second set of bit values.*

*In one aspect, a wireless payment method is disclosed. In one embodiment, the wireless payment method includes receiving by the interrogator an identification code, separate from the identifier, from the RFID device to identify a person to be charged for payment. In an alternative embodiment, an owner of an RFID device is determined based at least in part on a unique number identifier of the RFID device; and an account held by the owner is debited. In yet another alternative embodiment, funds are received for the remote payment of goods or services based at least on part on a reply and a unique identifier of an RFID device. In yet another alternative embodiment, an account to be charged for payment is identified based at least in part on a reply and a unique identifier of an RFID device and funds of the identified account associated with the RFID device are debited.*

*In another aspect of the invention, an initiating radio frequency identification (RFID) device is disclosed.*

*In another aspect of the invention, a target radio frequency identification (RFID) device is disclosed.*

Another aspect of the invention provides a method of establishing wireless communications between an interrogator and individual ones of multiple wireless identification devices. A tree search method is utilized to establish communications without collision between the interrogator and individual ones of the multiple wireless identification devices. A search tree is defined for the tree search method. The tree has multiple levels representing subgroups of the multiple wireless identification devices. The number of devices in a subgroup in one level is half of the number of devices in the next higher level. The tree search method employs level skipping wherein at least one level of the tree is skipped.

Another aspect of the invention provides a communications system comprising an interrogator, and a plurality of wireless identification devices configured to communicate with the interrogator in a wireless fashion. The respective wireless identification devices have a unique identification number. The interrogator is configured to employ a tree search technique to determine the unique identification numbers of the different wireless identification devices so as to be able to establish communications between the interrogator and individual ones of the multiple wireless identification devices without collision by multiple wireless identification devices attempting to respond to the interrogator at the same time. Levels of the tree are occasionally skipped.

One aspect of the invention provides a radio frequency identification device comprising an integrated circuit including a receiver, a transmitter, and a microprocessor. In one embodiment, the integrated circuit is a monolithic single die single metal layer integrated circuit including the receiver, the transmitter, and the microprocessor. The device of this embodiment includes an active transponder, instead of a transponder which relies on magnetic coupling for power, and therefore has a much greater range.

*In one embodiment, an interrogator may send a first command indicating a first value and a first memory range, and a second command indicating second value and a second memory range. The first memory range may differ from the second memory range by at least two bits. RFID tags may compare the first and second values to corresponding values stored in the tags to determine if the tags are selected. Selected tags may respond to the interrogator with independently generated random numbers.*

BRIEF DESCRIPTION OF THE DRAWINGS

Preferred embodiments of the invention are described below with reference to the following accompanying drawings.

FIG. 4 is a diagram illustrating a tree splitting sort method for establishing communication with a radio frequency identification device in a field of a plurality of such devices.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
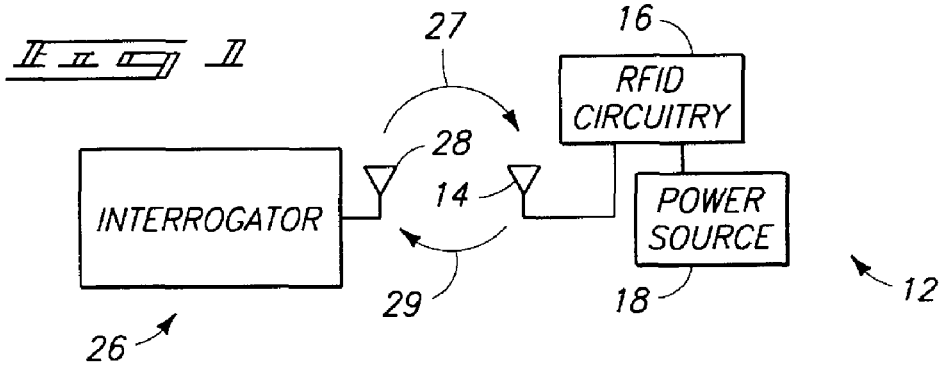
FIG. 1 is a high level circuit schematic showing an interrogator and a radio frequency identification device embodying the invention.

FIG. 1 illustrates a wireless identification device 12 in accordance with one embodiment of the invention. In the illustrated embodiment, the wireless identification device is a radio frequency data communication device 12, and includes RFID circuitry 16. In the illustrated embodiment, the RFID circuitry is defined by an integrated circuit as described in the above-incorporated patent application Ser. No. 08/705,043, filed Aug. 29, 1996, *now U.S. Pat. No. 6,130,602*. Other embodiments are possible. A power source 18 is connected to the integrated circuit 16 to supply power to the integrated circuit 16. In one embodiment, the power source 18 comprises a battery. The device 12 further includes at least one antenna 14 connected to the circuitry 16 for wireless or radio frequency transmission and reception by the circuitry 16.

The device 12 transmits and receives radio frequency communications to and from an interrogator 26. An exemplary interrogator is described in commonly assigned U.S. patent application Ser. No. 08/907,689, filed Aug. 8, 1997 [and], *now U.S. Pat. No. 6,289,209, which is* incorporated herein by reference. Preferably, the interrogator 26 includes an antenna 28, as well as dedicated transmitting and receiving circuitry, similar to that implemented on the integrated circuit 16.

Generally, the interrogator 26 transmits an interrogation signal or command 27 via the antenna 28. The device 12 receives the incoming interrogation signal via its antenna 14. Upon receiving the signal 27, the device 12 responds by generating and transmitting a responsive signal or reply 29. The responsive signal 29 typically includes information that uniquely identifies, or labels the particular device 12 that is transmitting, so as to identify any object or person with which the device 12 is associated.

Although only one device 12 is shown in FIG. 1, typically there will be multiple devices 12 that correspond with the interrogator 26, and the particular devices 12 that are in communication with the interrogator 26 will typically change over time. In the illustrated embodiment in FIG. 1, there is no communication between multiple devices 12. Instead, the devices 12 respectively communicate with the interrogator 26. Multiple devices 12 can be used in the same field of an interrogator 26 (i.e., within communications range of an interrogator 26). Similarly, multiple interrogators 26 can be in proximity to one or more of the devices 12.

The radio frequency data communication device 12 can be included in any appropriate housing or packaging. Various methods of manufacturing housings are described in commonly assigned U.S. patent application Ser. No. 08/800,037, filed Feb. 13, 1997, [and] *now U.S. Pat. No. 5,988,510, which is* incorporated herein by reference.

Figure 2:
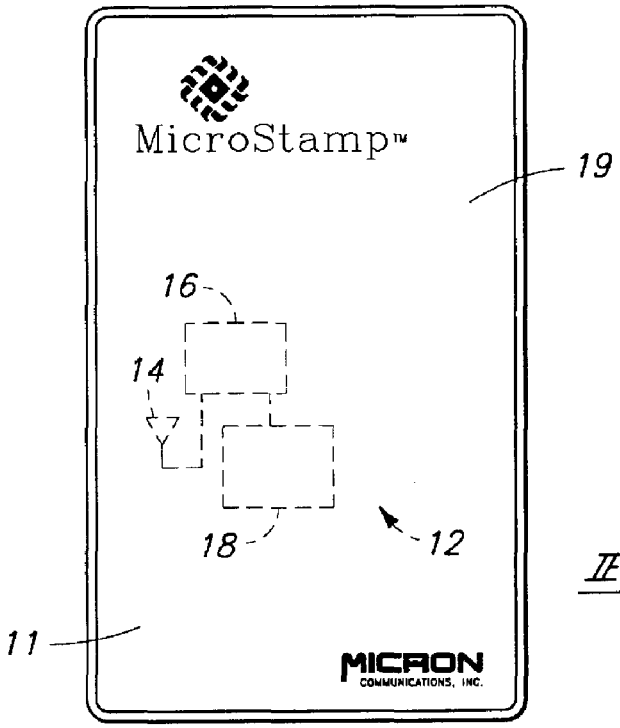
FIG. 2 is a front view of a housing, in the form of a badge or card, supporting the circuit of FIG. 1 according to one embodiment the invention.

FIG. 2 shows but one embodiment in the form of a card or badge 19 including [the radio frequency data communication device 12, and] a housing 11 [including] *of* plastic or other suitable material *supporting the device 12 and the power supply 18*. In one embodiment, the front face of the badge has visual identification features such as graphics, text, information found on identification or credit cards, etc.

Figure 3:
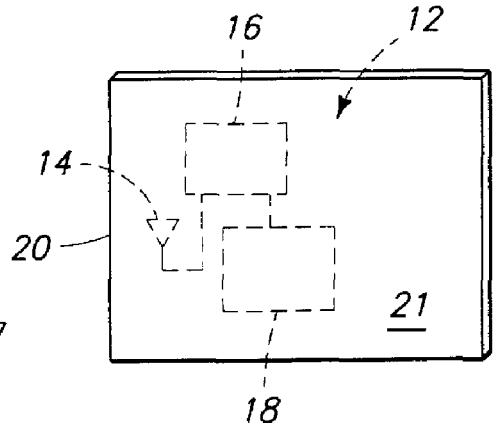
FIG. 3 is a front view of a housing supporting the circuit of FIG. 1 according to another embodiment of the invention.
Figure 2:
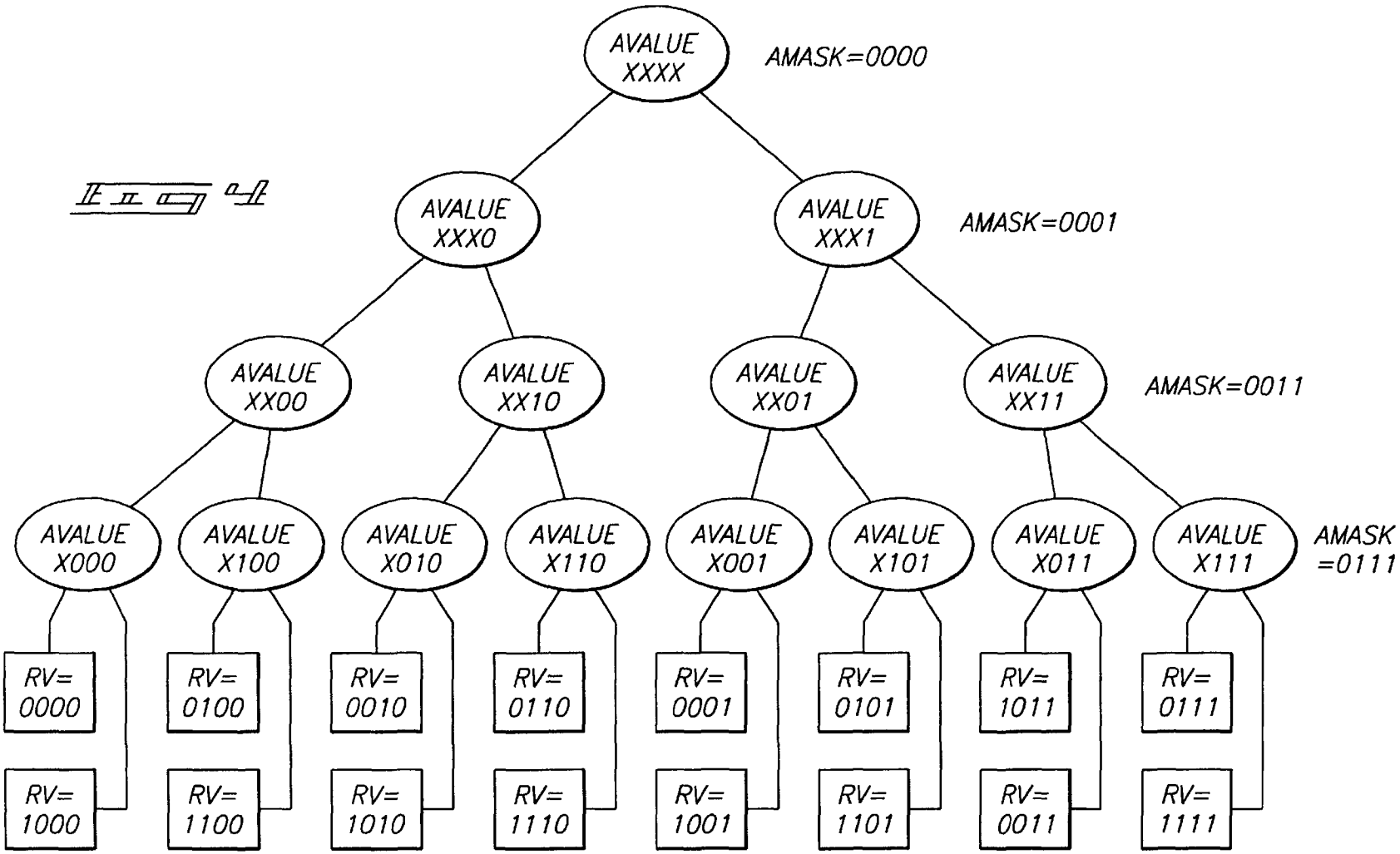

FIG. 3 illustrates but one alternative housing supporting the device 12. More particularly, FIG. 3 shows a miniature housing 20 encasing the device 12 to define a tag which can be supported by an object (e.g., hung from an object, affixed to an object, etc.). Although two particular types of housings have been disclosed, the device 12 can be included in any appropriate housing.

If the power source 18 is a battery, the battery can take any suitable form. Preferably, the battery type will be selected depending on weight, size, and life requirements for a particular application. In one embodiment, the battery 18 is a thin profile button-type cell forming a small, thin energy cell more commonly utilized in watches and small electronic devices requiring a thin profile. A conventional button-type cell has a pair of electrodes, an anode formed by one face and a cathode formed by an opposite face. In an alternative embodiment, the power source 18 comprises a series connected pair of button type cells. Instead of using a battery, any suitable power source can be employed.

The circuitry 16 further includes a backscatter transmitter and is configured to provide a responsive signal to the interrogator 26 by radio frequency. More particularly, the circuitry 16 includes a transmitter, a receiver, and memory such as is described in U.S. patent application Ser. No. 08/705,043, *now U.S. Pat. No. 6,130,602*.

Radio frequency identification has emerged as a viable and affordable alternative to tagging or labeling small to large quantities of items. The interrogator 26 communicates with the devices 12 via an RF link, so all transmissions by the interrogator 26 are heard simultaneously by all devices 12 within range.

If the interrogator 26 sends out a command requesting that all devices 12 within range identify themselves, and gets a large number of simultaneous replies, the interrogator 26 may not be able to interpret any of these replies. Therefore, arbitration schemes are provided.

If the interrogator 26 has prior knowledge of the identification number of a device 12 which the interrogator 26 is looking for, it can specify that a response is requested only from the device 12 with that identification number. To target a command at a specific device 12, (i.e., to initiate point-on-point communication), the interrogator 26 must send a number identifying a specific device 12 along with the command. At start-up, or in a new or changing environment, these identification numbers are not known by the interrogator 26. Therefore, the interrogator 26 must identify all devices 12 in the field (within communication range) such as by determining the identification numbers of the devices 12 in the field. After this is accomplished, point-to-point communication can proceed as desired by the interrogator 26.

Generally speaking, RFID systems are a type of multiaccess communication system. The distance between the interrogator 26 and devices 12 within the field is typically fairly short (e.g., several meters), so packet transmission time is determined primarily by packet size and baud rate. Propagation delays are negligible. In RFID systems, there is a potential for a large number of transmitting devices 12 and there is need for the interrogator 26 to work in a changing environment, where different devices 12 are swapped in and out frequently (e.g., as inventory is added or removed). In such systems, the inventors have determined that the use of random access methods work effectively for contention resolution (i.e., for dealing with collisions between devices 12 attempting to respond to the interrogator 26 at the same time).

RFID systems have some characteristics that are different from other communications systems. For example, one characteristic of the illustrated RFID systems is that the devices 12 never communicate without being prompted by the interrogator 26. This is in contrast to typical multiaccess systems where the transmitting units operate more independently. In addition, contention for the communication medium is short lived as compared to the ongoing nature of the problem in other multiaccess systems. For example, in a RFID system, after the devices 12 have been identified, the interrogator can communicate with them in a point-to-point fashion. Thus, arbitration in a RFID system is a transient rather than steady-state phenomenon. Further, the capability of a device 12 is limited by practical restrictions on size, power, and cost. The lifetime of a device 12 can often be measured in terms of number of transmissions before battery power is lost. Therefore, one of the most important measures of system performance in RFID arbitration is total time required to arbitrate a set of devices 12. Another measure is power consumed by the devices 12 during the process. This is in contrast to the measures of throughput and packet delay in other types of multiaccess systems.

FIG. 4 illustrates one arbitration scheme that can be employed for communication between the interrogator and devices 12. Generally, the interrogator 26 sends a command causing each device 12 of a potentially large number of responding devices 12 to select a random number from a known range and use it as that device's arbitration number. By transmitting requests for identification to various subsets of the full range of arbitration numbers, and checking for an error-free response, the interrogator 26 determines the arbitration number of every responder station capable of communicating at the same time. Therefore, the interrogator 26 is able to conduct subsequent uninterrupted communication with devices 12, one at a time, by addressing only one device 12.

Three variables are used: an arbitration value (AVALUE), an arbitration mask (AMASK), and a random value ID (RV). The interrogator sends an Identify command (IdentifyCmnd) causing each device of a potentially large number of responding devices to select a random number from a known range and use it as that device's arbitration number. The interrogator sends an arbitration value (AVALUE) and an arbitration mask (AMASK) to a set of devices 12. The receiving devices 12 evaluate the following equation: (AMASK & AVALUE)==(AMASK & RV) wherein "&" is a bitwise AND function, and wherein "==" is an equality function. If the equation evaluates to "1" (TRUE), then the device 12 will reply. If the equation evaluates to "0" (FALSE), then the device 12 will not reply. By performing this in a structured manner, with the number of bits in the arbitration mask being increased by one each time, eventually a device 12 will respond with no collisions. Thus, a binary search tree methodology is employed.

An example using actual numbers will now be provided using only four bits, for simplicity, reference being made to FIG. 4. In one embodiment, sixteen bits are used for AVALUE and AMASK. Other numbers of bits can also be employed depending, for example, on the number of devices 12 expected to be encountered in a particular application, on desired cost points, etc.

Assume, for this example, that there are two devices 12 in the field, one with a random value (RV) of 1100 (binary), and another with a random value (RV) of 1010 (binary). The interrogator is trying to establish communications without collisions being caused by the two devices 12 attempting to communicate at the same time.

The interrogator sets AVALUE to 0000 (or "don't care" for all bits, as indicated by the character "X" in FIG. 4) and AMASK to 0000. The interrogator transmits a command to all devices 12 requesting that they identify themselves. Each of the devices 12 evaluate (AMASK & AVALUE)==(AMASK & RV) using the random value RV that the respective devices 12 selected. If the equation evaluates to "1" (TRUE), then the device 12 will reply. If the equation evaluates to "0" (FALSE), then the device 12 will not reply. In the first level of the illustrated tree, AMASK is 0000 and anything bitwise ANDed with all zeros results in all zeros, so both the devices 12 in the field respond, and there is a collision.

Next, the interrogator sets AMASK to 0001 and AVALUE to 0000 and transmits an identify command. Both devices 12 in the field have a zero for their least significant bit, and (AMASK & AVALUE)==(AMASK & RV) will be true for both devices 12. For the device 12 with a random value of 1100, the left side of the equation is evaluated as follows (0001 & 0000)=0000. The right side is evaluated as (0001 & 1100)=0000. The left side equals the right side, so the equation is true for the device 12 with the random value of 1100. For the device 12 with a random value of 1010, the left side of the equation is evaluated as (0001 & 0000)=0000. The right side is evaluated as (0001 & 1010)=0000. The left side equals the right side, so the equation is true for the device 12 with the random value of 1010. Because the equation is true for both devices 12 in the field, both devices 12 in the field respond, and there is another collision.

Recursively, the interrogator next sets AMASK to 0011 with AVALUE still at 0000 and transmits an Identify command. (AMASK & AVALUE)==(AMASK & RV) is evaluated for both devices 12. For the device 12 with a random value of 1100, the left side of the equation is evaluated as follows (0011 & 0000)=0000. The right side is evaluated as (0011 & 1100)=0000. The left side equals the right side, so the equation is true for the device 12 with the random value of 1100, so this device 12 responds For the device 12 with a random value of 1010, the left side of the equation is evaluated as (0011 & 0000)=0000. The right side is evaluated as (0011 & 1010)=0010. The left side does not equal the right side, so the equation is false for the device 12 with the random value of 1010, and this device 12 does not respond. Therefore, there is no collision, and the interrogator can determine the identity (e.g., an identification number) for the device 12 that does respond.

De-recursion takes place, and the devices 12 to the right for the same AMASK level are accessed when AVALUE is set at 0010, and AMASK is set to 0011.

The device 12 with the random value of 1010 receives a command and evaluates the equation (AMASK & AVALUE)==(AMASK & RV). The left side of the equation is evaluated as (0011 & 0010)=0010. The right side of the equation is evaluated as (0011 & 1010)=0010. The right side equals the left side, so the equation is true for the device 12 with the random value of 1010. Because there are no other devices 12 in the subtree, a good reply is returned by the device 12 with the random value of 1010. There is no collision, and the interrogator can determine the identity (e.g., an identification number) for the device 12 that does respond.

By recursion, what is meant is that a function makes a call to itself. In other words, the function calls itself within the body of the function. After the called function returns, de-recursion takes place and execution continues at the place just after the function call; i.e. at the beginning of the statement after the function call.

For instance, consider a function that has four statements (numbered 1,2,3,4) in it, and the second statement is a recursive call. Assume that the fourth statement is a return statement. The first time through the loop (iteration 1) the function executes the statement 2 and (because it is a recursive call) calls itself causing iteration 2 to occur. When iteration 2 gets to statement 2, it calls itself making iteration 3. During execution in iteration 3 of statement 1, assume that the function does a return. The information that was saved on the stack from iteration 2 is loaded and the function resumes execution at statement 3 (in iteration 2), followed by the execution of statement 4 which is also a return statement. Since there are no more statements in the function, the function de-recurses to iteration 1. Iteration 1, had previously recursively called itself in statement 2. Therefore, it now executes statement 3 (in iteration 1). Following that it executes a return at statement 4. Recursion is known in the art.

Consider the following code which can be used to implement operation of the method shown in FIG. 4 and described above.

```
Arbitrate(AMASK, AVALUE)
    {
    collision=IdentifyCmnd(AMASK, AVALUE)
    if (collision) then
            {
              /* recursive call for left side */
             Arbitrate((AMASK<<1)+1, AVALUE)
              /* recursive call for right side */
        Arbitrate((AMASK<<1)+1, AVALUE+(AMASK+1))
        }          /* endif */
    } /* return */
```

The symbol "<<" represents a bitwise left shift. "<<1" means shift left by one place. Thus, 0001<<1 would be 0010. Note, however, that AMASK is originally called with a value of zero, and 0000<<1 is still 0000. Therefore, for the first recursive fall, AMASK=(AMASK<<1)+1. So for the first recursive call, the value of AMASK is 0000+0001=0001. For the second call, AMASK=(0001<<1)+1=0010+1=0011. For the third recursive call, AMASK=(0011<<1)+1=0110+1=0111.

The routine generates values for AMASK and AVALUE to be used by the interrogator in an identify command "IdentifyCmnd." Note that the routine calls itself if there is a collision. De-recursion occurs when there is no collision. AVALUE and AMASK would have values such as the following assuming collisions take place all the way down to the bottom of the tree.

| AVALUE | AMASK |
|---|---|
| 0000 | 0000 |
| 0000 | 0001 |
| 0000 | 0011 |
| 0000 | 0111 |
| 0000 | 1111* |
| 1000 | 1111* |
| 0100 | 0111 |
| 0100 | 1111* |
| 1100 | 1111* |

This sequence of AMASK, AVALUE binary numbers assumes that there are collisions all the way down to the bottom of the tree, at which point the Identify command sent by the interrogator is finally successful so that no collision occurs. Rows in the table for which the interrogator is successful in receiving a reply without collision are marked with the symbol "*". Note that if the Identify command was successful at, for example, the third line in the table then the interrogator would stop going down that branch of the tree and start down another, so the sequence would be as shown in the following table.

| AVALUE | AMASK |
|---|---|
| 0000 | 0000 |
| 0000 | 0001 |
| 0000 | 0011* |
| 0010 | 0011 |
| . . . | . . . |

This method is referred to as a splitting method. It works by splitting groups of colliding devices 12 into subsets that are resolved in turn. The splitting method can also be viewed as a type of tree search. Each split moves the method one level deeper in the tree.

Either depth-first or breadth-first traversals of the tree can be employed. Depth first traversals are performed by using recursion, as is employed in the code listed above. Breadth-first traversals are accomplished by using a queue instead of recursion. The following is an example of code for performing a breadth-first traversal.

```
Arbitrate(AMASK, AVALUE)
    {
     enqueue(0,0)
     while (queue != empty)
         (AMASK,AVALUE) dequeue( )
         collision=IdentifyCmnd(AMASK, AVALUE)
```

-continued

```
         if (collision) then
         {
          TEMP = AMASK+1
          NEW_AMASK = (AMASK<<1)+1
          enqueue(NEW_AMASK, AVALUE)
          enqueue(NEW_AMASK, AVALUE+TEMP)
         }          /* endif */
endwhile
}/* return */
```

The symbol "!=" means not equal to. AVALUE and AMASK would have values such as those indicated in the following table for such code.

| AVALUE | AMASK |
|---|---|
| 0000 | 0000 |
| 0000 | 0001 |
| 0001 | 0001 |
| 0000 | 0011 |
| 0010 | 0011 |
| 0001 | 0011 |
| 0011 | 0011 |
| 0000 | 0111 |
| 0100 | 0111 |
| . . . | . . . |

Rows in the table for which the interrogator is successful in receiving a reply without collision are marked with the symbol "*".

Figure 5:
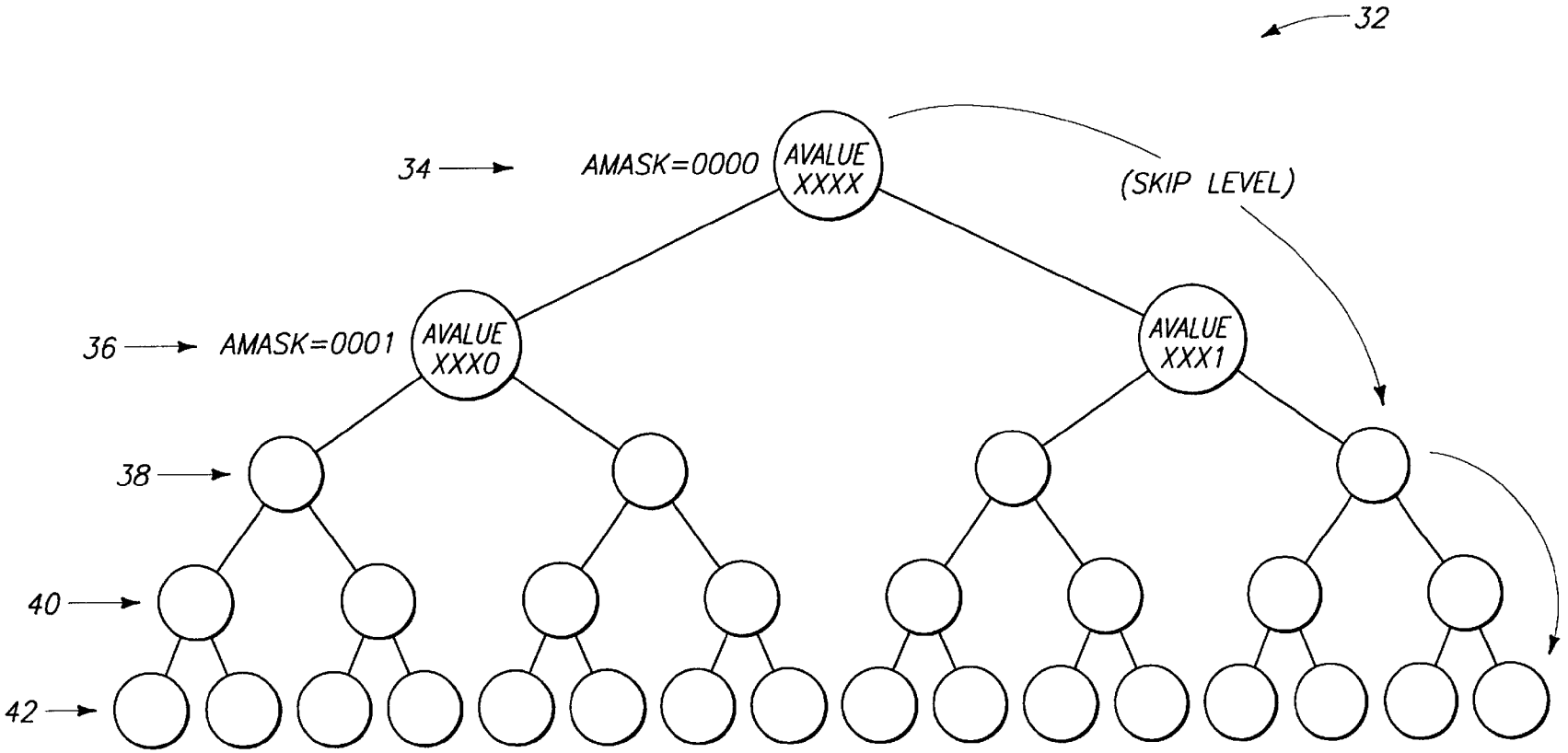
FIG. 5. is a diagram illustrating a modified tree splitting sort method for establishing communication with a radio frequency identification device in a field of a plurality of such devices.

FIG. 5 illustrates an embodiment wherein levels in the tree are skipped. The inventors have determined that skipping levels in the tree, after a collision caused by multiple devices 12 responding, reduces the number of subsequent collisions without adding significantly to the number of no replies. In real-time systems, it is desirable to have quick arbitration sessions on a set of devices 12 whose unique identification numbers are unknown. Level skipping reduces the number of collisions, both reducing arbitration time and conserving battery life on a set of devices 12.

Thus, FIG. 5 illustrates a binary search tree 32 being defined for a tree search method similar to the tree search method described in connection with FIG. 4. The tree 32 has multiple levels 34, 36, 38, 40, and 42 representing subgroups of the multiple devices 12. The number of devices in a subgroup in one level 34, 36, 38, 40, and 42 is half of the number of devices in the next higher level 34, 36, 38, 40, and 42. Although only five levels are shown, if more bits are employed, (e.g., sixteen bits or an integer multiple of eight or sixteen bits for each of AMASK and AVALUE), there will of course be more levels. The tree search method illustrated in FIG. 5 employs level skipping wherein at least one level of the tree is skipped.

A first predetermined number of bits, e.g. sixteen or an integer multiple of eight or sixteen bits, are established to be used as unique identification numbers. Respective devices 12 are provided with unique identification numbers respectively having the first predetermined numbers of bits, in addition to their random values RV. For example, such unique identification numbers are stored in memory in the respective devices 12.

A second predetermined number of bits are established to be used for the random values RV. The devices 12 are caused to select random values, RV. This is done, for example, by the interrogator 26 sending an appropriate command. Respective devices choose random values independently of random values selected by the other devices 12. Random number generators are known in the art.

The interrogator transmits a command requesting devices 12 having random values RV within a specified group of random values to respond, using a methodology similar to that described in connection with FIG. 4, except that levels are skipped. Four subsets of random values, instead of two, are probed when moving down the tree and skipping a level. This means that instead of eliminating half of the remaining devices 12 and re-trying, after a collision, the interrogator eliminates three quarters of the remaining devices 12 and re-tries (by sending a command). In other words, a new specified group is created that is one quarter of the set of random values of the previous group.

Each devices 12 that receives the command determines if its chosen random value falls within the specified group by evaluating the equation (AMASK & AVALUE)==(AMASK & RV) and, if so, sends a reply, to the interrogator. The reply includes the random value of the replying device 12 and the unique identification number of the device 12. The interrogator determines if a collision occurred between devices that sent a reply and, if so, creates a new, smaller, specified group, by moving down the tree, skipping a level.

In the illustrated embodiment, every other level is skipped. In alternative embodiments, more than one level is skipped each time.

The trade off that must be considered in determining how many (if any) levels to skip with each decent down the tree is as following. Skipping levels reduces the number of collisions, thus saving battery power in the devices 12. Skipping deeper (skipping more than one level) further reduces the number of collisions. The more levels that are skipped, the greater the reduction in collisions. However, skipping levels results in longer search times because the number of queries (Identify commands) increases. The more levels that are skipped, the longer the search times. The inventors have determined that skipping just one level has an almost negligible effect on search time, but drastically reduces the number of collisions. If more than one level is skipped, search time increases substantially.

The inventors have determined that skipping every other level drastically reduces the number of collisions and saves battery power with out significantly increasing the number of queries.

After receiving a reply without collision from a device 12, the interrogator 26 can send a command individually addressed to that device by using its now known random value or its now known unique identification number.

The above described code for depth-first traversal is modified to provide for level skipping by increasing the number of recursive calls as shown below. For example, the above described code for depth-first traversal is replaced with code such as the following to provide for depth-first traversal employing level skipping.

```
Arbitrate(AMASK, AVALUE)
    {
     collision=IdentifyCmnd(AMASK, AVALUE)
     if (collision) then
        {
         TEMP = AMASK+1
         NEW_AMASK = (AMASK<<2)+3
         Arbitrate(NEW_AMASK, AVALUE)
         Arbitrate(NEW_AMASK, AVALUE+TEMP)
         Arbitrate(NEW_AMASK, AVALUE+2*TEMP)
```

-continued

```
         Arbitrate(NEW_AMASK, AVALUE+3*TEMP)
        }          /* endif */
    }/* return */
```

AVALUE and AMASK would have values such as those indicated in the following table for such code.

| AVALUE | AMASK |
|---|---|
| 0000 | 0000 |
| 0000 | 0011 |
| 0000 | 1111* |
| 0100 | 1111* |
| 1000 | 1111* |
| 1100 | 1111* |
| 0001 | 0011 |
| 0001 | 1111* |
| 0101 | 1111* |
| 1001 | 1111* |
| 1101 | 1111* |
| 0010 | 0011 |
| 0010 | 1111* |
| 0110 | 1111* |
| 1010 | 1111* |
| 1110 | 1111* |
| . . . | . . . |

Rows in the table for which the interrogator is successful in receiving a reply without collision are marked with the symbol "*".

Similarly, the code provided above for breadth-first traversal can be readily modified to employ level skipping. Instead of inserting two items into the queue each time through the loop, four items are inserted into the queue each time through the loop. For either breadth-first traversal or depth-first traversal, AMASK will be shifted by two bits instead of one, and AVALUE will take on twice as many different values as in the case where level skipping is not employed.

Another arbitration method that can be employed is referred to as the "Aloha" method. In the Aloha method, every time a device 12 is involved in a collision, it waits a random period of time before retransmitting. This method can be improved by dividing time into equally sized slots and forcing transmissions to be aligned with one of these slots. This is referred to as "slotted Aloha." In operation, the interrogator asks all devices 12 in the field to transmit their identification numbers in the next time slot. If the response is garbled, the interrogator informs the devices 12 that a collision has occurred, and the slotted Aloha scheme is put into action. This means that each device 12 in the field responds within an arbitrary slot determined by a randomly selected value. In other words, in each successive time slot, the devices 12 decide to transmit their identification number with a certain probability.

The Aloha method is based on a system operated by the University of Hawaii. In 1971, the University of Hawaii began operation of a system named Aloha. A communication satellite was used to interconnect several university computers by use of a random access protocol. The system operates as follows. Users or devices transmit at any time they desire. After transmitting, a user listens for an acknowledgment from the receiver or interrogator. Transmissions from different users will sometimes overlap in time (collide), causing reception errors in the data in each of the contending messages. The errors are detected by the receiver, and the receiver sends a negative acknowledgment to the users. When a negative acknowledgment is received, the messages are retransmitted by the colliding users after a random delay. If the colliding users attempted to retransmit without the random delay, they would collide again. If the user does not receive either an acknowledgment or a negative acknowledgment within a certain amount of time, the user "times out" and retransmits the message.

There is a scheme known as slotted Aloha which improves the Aloha scheme by requiring a small amount of coordination among stations. In the slotted Aloha scheme, a sequence of coordination pulses is broadcast to all stations (devices). As is the case with the pure Aloha scheme, packet lengths are constant. Messages are required to be sent in a slot time between synchronization pulses, and can be started only at the beginning of a time slot. This reduces the rate of collisions because only messages transmitted in the same slot can interfere with one another. The retransmission mode of the pure Aloha scheme is modified for slotted Aloha such that if a negative acknowledgment occurs, the device retransmits after a random delay of an integer number of slot times.

Aloha methods are described in [a] commonly assigned patent application [(attorney docket number MI40-089) naming Clifton W. Wood, Jr. as an inventor, titled "Method of Addressing Messages and Communications System," filed concurrently herewith, and] *Ser. No. 09/026,248, filed Feb. 19, 1998, now U.S. Pat. No. 6,275,476, which is* incorporated herein by reference.

In one alternative embodiment, an Aloha method is combined with level skipping, such as the level skipping shown and described in connection with FIG. 5. For example, in one embodiment, devices 12 sending a reply to the interrogator 26 do so within a randomly selected time slot of a number of slots.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

[1. A method of establishing wireless communications between an interrogator and wireless identification devices, the method comprising utilizing a tree search technique to establish communications without collision between the interrogator and individual ones of the multiple wireless identification devices, the method including using a binary search tree having multiple levels representing subgroups of the multiple wireless identification devices, the number of devices in a subgroup in one level being less than the number of devices in the next level, the tree search technique employing level skipping wherein every second level of the tree is skipped.]

[2. A method in accordance with claim 1 wherein the wireless identification device comprises an integrated circuit including a receiver, a modulator, and a microprocessor in communication with the receiver and modulator.]

[3. A method in accordance with claim 1 wherein when a subgroup contains both a device that is within communications range of the interrogator, and a device that is not within communications range of the interrogator, the device that is not within communications range of the interrogator does not respond to the command.]

[4. A method in accordance with claim 1 wherein when a subgroup contains both a device that is within communications range of the interrogator, and a device that is not within communications range of the interrogator, the device that is within communications range of the interrogator responds to the command.]

[5. A method in accordance with claim 1 wherein a device in a subgroup changes between being within communications range of the interrogator and not being within communications range, over time.]

[6. A method of addressing messages from an interrogator to a selected one or more of a number of communications devices, the method comprising:

establishing for respective devices unique identification numbers;

causing the devices to select random values, wherein respective devices choose random values independently of random values selected by the other devices;

transmitting a communication, from the interrogator, requesting devices having random values within a specified group of random values to respond;

receiving the communication at multiple devices, devices receiving the communication respectively determining if the random value chosen by the device falls within the specified group and, if so, sending a reply to the interrogator; and determining using the interrogator if a collision occurred between devices that sent a reply and, if so, creating a new, smaller, specified group, using a search tree, that is one quarter of the first mentioned specified group, wherein at least one level of a search tree is skipped.]

[7. A method of addressing messages from an interrogator to a selected one or more of a number of communications devices in accordance with claim 6 wherein sending a reply to the interrogator comprises transmitting the unique identification number of the device sending the reply.]

[8. A method of addressing messages from an interrogator to a selected one or more of a number of communications devices in accordance with claim 6 wherein sending a reply to the interrogator comprises transmitting the random value of the device sending the reply.]

[9. A method of addressing messages from an interrogator to a selected one or more of a number of communications devices in accordance with claim 6 wherein sending a reply to the interrogator comprises transmitting both the random value of the device sending the reply and the unique identification number of the device sending the reply.]

[10. A method of addressing messages from an interrogator to a selected one or more of a number of communications devices in accordance with claim 6 wherein, after receiving a reply without collision from a device, the interrogator sends a command individually addressed to that device.]

[11. A method of addressing messages from a transponder to a selected one or more of a number of communications devices, the method comprising:

causing the devices to select random values, wherein respective devices choose random values independently of random values selected by the other devices;

transmitting a communication, from the transponder, requesting devices having random values within a specified group of a plurality of possible groups of random values to respond, the specified group being less than or equal to the entire set of random values, the plurality of possible groups being organized in a binary tree having a plurality of levels, wherein groups of random values decrease in size with each level descended;

devices receiving the communication respectively determining if the random value chosen by the device falls within the specified group and, if so, sending a reply to the transponder; and, if not, not sending a reply; and determining using the transponder if a collision occurred between devices that sent a reply and, if so, creating a new, smaller, specified group by descending at least two levels in the tree.]

[12. A method of addressing messages from a transponder to a selected one or more of a number of communications devices in accordance with claim 11 and further comprising establishing unique identification numbers for respective devices.]

[13. A method of addressing messages from a transponder to a selected one or more of a number of communications devices in accordance with claim 12 and further including establishing a predetermined number of bits to be used for the random values.]

[14. A method of addressing messages from a transponder to a selected one or more of a number of communications devices in accordance with claim 13 wherein the predetermined number of bits to be used for the random values comprises sixteen bits.]

[15. A method of addressing messages from a transponder to a selected one or more of a number of communications devices in accordance with claim 13 wherein devices sending a reply to the transponder do so within a randomly selected time slot of a number of slots.]

[16. A method of addressing messages from an interrogator to a selected one or more of a number of RFID devices, the method comprising:

establishing for respective devices unique identification numbers;

causing the devices to select random values, wherein respective devices choose random values independently of random values selected by the other devices;

transmitting from the interrogator a command requesting devices having random values within a specified group of a plurality of possible groups of random values to respond, the specified group being less than or equal to the entire set of random values, the plurality of possible groups being organized in a binary tree having a plurality of levels, wherein groups of random values decrease in size with each level;

receiving the command at multiple of the devices, the devices receiving the command respectively determining if the random value chosen by the device falls within the specified group and, only if so, sending a reply to the interrogator, wherein sending a reply to the interrogator comprises transmitting both the random value of the device sending the reply and the unique identification number of the device sending the reply;

determining using the interrogator if a collision occurred between devices that sent a reply and, if so, creating a new, smaller, specified group using a level of the tree different from the level used in the interrogator transmitting, wherein at least one level of the tree is skipped, the interrogator transmitting a command requesting devices having random values within the new specified group of random values to respond; and if a reply without collision is received from a device, the interrogator subsequently sending a command individually addressed to that device.]

[17. A method of addressing messages from an interrogator to a selected one or more of a number of RFID devices in accordance with claim 16 wherein every second level is skipped.]

[18. A method of addressing messages from an interrogator to a selected one or more of a number of RFID devices in accordance with claim 16 wherein the unique identification numbers are respectively defined by a predetermined number of bits.]

[19. A method of addressing messages from an interrogator to a selected one or more of a number of RFID devices in accordance with claim 16 wherein the unique identification numbers are respectively defined by a predetermined number of bits and wherein the random values are respectively defined by a predetermined number of bits.]

[20. A method of addressing messages from an interrogator to a selected one or more of a number of RFID devices in accordance with claim 16 and further comprising, after the interrogator transmits a command requesting devices having random values within the new specified group of random values to respond:

devices receiving the command respectively determining if their chosen random values fall within the new smaller specified group and, if so, sending a reply to the interrogator.]

[21. A method of addressing messages from an interrogator to a selected one or more of a number of RFID devices in accordance with claim 20 and further comprising, after the interrogator transmits a command requesting devices having random values within the new specified group of random values to respond:

determining if a collision occurred between devices that sent a reply and, if so, creating a new specified group and repeating the transmitting of the command requesting devices having random values within a specified group of random values to respond using different specified groups until all of the devices within communications range are identified.]

[22. A system comprising:

an interrogator;

a number of communications devices capable of wireless communications with the interrogator;

means for establishing for respective devices unique identification numbers respectively having the first predetermined number of bits;

means for causing the devices to select random values, wherein respective devices choose random values independently of random values selected by the other devices;

means for causing the interrogator to transmit a command requesting devices having random values within a specified group of random values to respond;

means for causing devices receiving the command to determine if their chosen random values fall within the specified group and, if so, to send a reply to the interrogator; and means for causing the interrogator to determine if a collision occurred between devices that sent a reply and, if so, to create a new, smaller, specified group that is one quarter of the first mentioned specified group, wherein at least one level of the tree is skipped.]

[23. A system in accordance with claim 22 wherein sending a reply to the interrogator comprises transmitting the unique identification number of the device sending the reply.]

[24. A system in accordance with claim 22 wherein sending a reply to the interrogator comprises transmitting the random value of the device sending the reply.]

[25. A system in accordance with claim 22 wherein sending a reply to the interrogator comprises transmitting both the random value of the device sending the reply and the unique identification number of the device sending the reply.]

[26. A system in accordance with claim 22 wherein the interrogator further includes means for, after receiving a reply without collision from a device, sending a command individually addressed to that device.]

*27. A method for initiating wireless communication with radio frequency identification (RFID) devices, comprising:*

*transmitting a first command specifying a first bit sequence;*

*receiving a first response to the first command from an RFID device having a first portion of a random number identifier generated by the RFID device equal to the first bit sequence, the first response including at least a second portion of the random number identifier generated by the RFID device;*

*detecting a collision in the first response;*

*responsive to detecting the collision, transmitting a second command following the first command in succession and absent any intervening commands, the second command specifying a second bit sequence that includes the first bit sequence and is at least two bits longer than the first bit sequence; and*

*receiving a second response to the second command from the RFID device indicating that the random number identifier generated by the RFID device includes the second bit sequence.*

*28. The method of claim 27, further comprising receiving an identification number from the RFID device, separate from the random number identifier, to identify a person with whom the RFID device is associated.*

*29. The method of claim 27, further comprising transmitting signals in accordance with a slotted anti-collision algorithm.*

*30. The method of claim 27, wherein the first command is to further specify a first value that provides an indication of a number of valid bits contained in the first bit sequence, and the second command is to further specify a second value that provides an indication of a number of valid bits contained in the second bit sequence.*

*31. The method of claim 27, further comprising transmitting a wake up signal to cause the RFID device to transition from a non-responsive state to a responsive state.*

*32. The method of claim 31, wherein the non-responsive state is a sleep state.*

*33. The method of claim 27, further comprising communicating at one of the bit rates supported by the RFID device.*

*34. The method of claim 27, further comprising generating a radio frequency (RF) field and modulating the RF field to transmit signals in an active mode, and modulating an RF field provided by a remote wireless device to transmit signals in a passive mode.*

*35. A radio frequency identification (RFID) system, comprising:*

*an RFID device to generate a random number identifier and to store an identification number, separate from the random number identifier, for use in identifying a person with whom the RFID device is associated; and*

*an interrogator to transmit a command comprising a first bit string to cause the RFID device to transmit at least a portion of the random number generated by the RFID device if the RFID device determines that the random number includes the first bit string, and to transmit a successive command, comprising a second bit string, absent any intervening commands, to cause the RFID device to transmit a response if the RFID device determines that the random number includes the second bit string, wherein the second bit string includes the first bit string plus at least two additional bits.*

*36. The system of claim 35, wherein the interrogator is to detect a collision upon receiving the at least portion of the random number generated by the RFID device, and wherein the successive command is to be transmitted responsive to detecting the collision.*

*37. The system of claim 35, wherein the interrogator is to transmit a signal to indicate a number of time slots available for response from a plurality of RFID devices in a field of the interrogator in accordance with a single device detection algorithm.*

*38. The system of claim 35, wherein the response comprises at least a second portion of the random number generated by the RFID device.*

*39. The system of claim 35, wherein the command further comprises a first value to indicate a number of valid bits contained in the command.*

*40. The system of claim 35, wherein the RFID device and the interrogator are configured to communicate at one of a plurality of bit rates identified by the interrogator.*

*41. The system of claim 35, wherein the RFID device is to transmit in a first mode in which the RFID device is to generate and modulate its own radio frequency (RF) field, and to transmit in a second mode in which the RFID device is to modulate an RF field provided by the interrogator.*

*42. A wireless payment method, comprising:*

*transmitting by an interrogator a first wireless command, specifying a first set of bit values, to request one or more first replies from one or more radio frequency identification (RFID) devices that have randomly generated the first set of bit values;*

*responsive to detecting a collision in the first replies, transmitting by the interrogator a second wireless command successively following the first wireless command, absent any intervening commands, and specifying a second set of bit values that include the first set of bit values and have at least two more bits than the first set, to request one or more second replies from one or more RFID devices that have randomly generated the second set of bit values;*

*responsive to receiving a reply, without collision, from an RFID device of the one or more RFID devices, transmitting by the interrogator a third wireless command comprising an identifier randomly generated by the RFID device to select the RFID device, the identifier including the second set of bit values; and*

*receiving by the interrogator an identification code, separate from the identifier, from the RFID device to identify a person to be charged for payment.*

*43. The method of claim 42, wherein the first replies comprise random numbers generated by the RFID devices.*

*44. The method of claim 42, further comprising transmitting a plurality of signals from the interrogator to indicate time slots in accordance with an adaptive slotted collision avoidance algorithm.*

*45. The method of claim 42, further comprising:*

*generating by the interrogator a radio frequency (RF) field;*

*modulating, by the interrogator, the RF field to transmit commands from the interrogator to the RFID devices; and*

*modulating, by the one or more RFID devices, the RF field generated by the interrogator to communicate responses from the one or more RFID devices to the interrogator.*

*46. The method of claim 45, further comprising the RFID device, wherein the RFID device is to further generate and modulate an RF field to wirelessly transmit signals to one or more remote devices.*

*47. The method of claim 45, wherein the first command is to further specify a first value that provides an indication of a number of valid bits contained in the first set of bit values, and the second command is to further specify a second value that provides an indication of a number of valid bits contained in the second set of bit values.*

*48. The method of claim 47, further comprising communicating between the interrogator and the one or more RFID devices at one of a plurality of bit rates selected by the interrogator.*

*49. The method of claim 42, further comprising transmitting by the interrogator a wake up signal to cause an RFID device to transition from a non-responsive state to a responsive state.*

*50. The method of claim 49, wherein the non-responsive state is a sleep state.*

*51. The method of claim 42, further comprising communicating between the interrogator and the one or more RFID devices at one of a plurality of bit rates selected by the interrogator.*

*52. An initiating radio frequency identification (RFID) device, comprising:*

*a transmitter to send a first signal, including a first portion of a first set of random numbers, to request a first set of one or more target RFID devices that have generated the first portion to respond with one or more first random values, and to send a second signal, including a second portion of a second set of one or more random numbers, to request a second set of one or more target RFID devices that have generated the second portion to respond, wherein the first set of random numbers includes the second set of random numbers;*

*an antenna to provide a radio frequency (RF) field to be modulated by the first and second sets of one or more target RFID devices to respond to the first and second signals;*

*a receiver to receive responses to the first and second signals; and*

*processing circuitry to detect a collision in the responses, wherein the second signal is to be sent successively after the first signal in response to a collision detected by the processing circuitry after the first signal is sent, and the second set of one or more random numbers is less than half of the first set of random numbers.*

*53. The initiating RFID device of claim 52, wherein the transmitter is to transmit signals in accordance with a slotted anti-collision algorithm.*

*54. The initiating RFID device of claim 52, wherein the transmitter is configured to send a wake up signal to cause target RFID devices to transition from a non-responsive state to a responsive state.*

*55. The initiating device of claim 52, wherein the receiver is to further receive one or more identification numbers from the RFID device, separate from the random number identifier, to identify a person with whom the RFID device is associated.*

*56. The initiating RFID device of claim 52, wherein the transmitter is configured to communicate with RFID devices at one of a plurality of bit rates determined by the initiating RFID device.*

*57. A target radio frequency identification (RFID) device, comprising:*

*memory storing information for use in determining an identity of a person with whom the RFID device is associated;*

*a receiver to receive, in succession, a first wireless command from an initiating RFID device and a second wireless command from the initiating RFID device, absent reception of any intervening wireless commands from the initiating RFID device, the first wireless command to provide a first set of bits and the second wireless command to provide a second set of bits, wherein the second set of bits includes the first set of bits and is longer than the first set of bits by at least two bits;*

*a random number generator to generate a random number identifier of the RFID device;*

*processing circuitry to compare the first set of bits with a first portion of the random number identifier to determine if they are equal, and to compare the second set of bits with a second portion of the random number identifier to determine if they are equal; and*

*a transmitter to transmit at least a third portion of the random number identifier in response to the first wireless command, before the second wireless command is received, if the first set of bits are determined to be equal to the first portion of the random number identifier, to transmit a response to the second wireless command if the second set of bits are determined to be equal to the second portion of the random number identifier, and to transmit the information.*

*58. The target RFID device of claim 57, wherein the third portion includes bits of the random number identifier not in the first portion.*

*59. The target RFID device of claim 57, wherein the receiver is configured to receive a wake up signal to transition from a non-responsive state to a responsive state.*

*60. The target RFID device of claim 57, wherein the target RFID device is to receive an indication of a change from a first number of slots to a second number of slots, and to randomly select a slot from the second number of slots in which to transmit a signal in accordance with a slotted anti-collision algorithm.*

*61. The target RFID device of claim 57, wherein the transmitter is configured to communicate at one of a plurality of bit rates specified by the initiating device.*

*62. The target RFID device of claim 57, wherein the transmitter is configured to provide a first reply at a first bit rate and a second reply at a second bit rate.*

*63. The target RFID device of claim 57, wherein the transmitter is to transmit the third portion of the random number identifier by modulating an RF field provided by the initiating device.*

*64. The target RFID device of claim 63, wherein the transmitter is to transmit the third portion of the random number in accordance with a first mode of operation during a first period of time, and, during a second period of time, the transmitter is to transmit signals in accordance with a second mode of operation in which the RFID device is to generate and modulate its own radio frequency (RF) field.*

*65. A wireless payment method, comprising:*

*transmitting a first command specifying a first bit sequence;*

*receiving a first response to the first command from an RFID device having a first portion of a unique number identifier equal to the first bit sequence, the first response including at least a second portion of the unique number identifier;*

*detecting that a collision has occurred with respect to the first response;*

*responsive to detecting that the collision has occurred, transmitting a second command following the first command in succession and absent any intervening commands, the second command specifying a second bit sequence that includes the first bit sequence and is at least two bits longer than the first bit sequence;*

*receiving a second response to the second command from the RFID device indicating that the unique number identifier includes the second bit sequence;*

*determining an owner of the RFID device based at least in part on said unique number identifier of said RFID device; and*

*causing debiting of an account held by said owner.*

*66. The method of claim 65, wherein the causing of the debiting of the account held by the owner is associated with the payment of a toll.*

*67. The method of claim 66, wherein a master wireless device is disposed within a toll both, and said method further comprises operating said master wireless device disposed within said toll both at least when said RFID device issuing said response to said first command is in proximity thereto.*

*68. The method of claim 66, wherein the causing the debiting of the account comprises receiving a credit card number against which the toll can be charged.*

*69. The method of claim 66, wherein the causing the debiting of the account comprises receiving a credit card number that can be charged.*

*70. The method of claim 66, wherein the causing the debiting of the account held by the owner is for payment for goods or services.*

*71. The method of claim 70, wherein the response comprises further information about the RFID device.*

*72. The method of claim 70, wherein the unique number identifier comprises a random number generated by the RFID device.*

*73. The method of claim 65, further comprising receiving an identification number from the RFID device, separate from the random number identifier, to identify a person with whom the RFID device is associated.*

*74. The method of claim 65, wherein the first command is to further specify a first value that provides an indication of a number of valid bits contained in the first bit sequence, and the second command is to further specify a second value that provides an indication of a number of valid bits contained in the second bit sequence.*

*75. The method of claim 65, further comprising transmitting a wake up signal to cause the RFID device to transition from a non-responsive state to a responsive state.*

*76. The method of claim 75, wherein the non-responsive state is a sleep state.*

*77. The method of claim 65, further comprising communicating at one of a plurality of bit rates supported by the RFID device.*

*78. The method of claim 65, further comprising generating a radio frequency (RF) field and modulating the RF field to transmit signals in an active mode, and modulating an RF field provided by a remote wireless device to transmit signals in a passive mode.*

*79. A wireless payment method, comprising:*

*transmitting by an interrogator a first wireless command, specifying a first set of bit values to request one or more first replies from one or more radio frequency identification (RFID) devices that have a respective unique identifier containing a portion equal to the first set of bit values;*

*responsive to detecting a collision in the first replies, transmitting by the interrogator a second wireless command successively following the first wireless command, absent any intervening commands, and specifying a second set of bit values that include the first set of bit values and have at least two more bits than the first set of bit values, to request one or more second replies from one or more RFID devices that have a respective unique identifier containing a portion equal to the second set of bit values;*

*responsive to receiving a reply, without collision, from an RFID device of the one or more RFID devices, transmitting by the interrogator a third wireless command comprising a unique identifier of the RFID device to select the RFID device, the unique identifier of the RFID device including the second set of bit values; and*

*receiving funds for the remote payment of goods or services based at least on part on the reply and the unique identifier of the RFID device.*

*80. The method of claim 79, further comprising disposing the one or more RFID devices at least partly within a card.*

*81. The method of claim 80, wherein the card further includes information typically found on a credit card.*

*82. A wireless payment method, comprising:*

*transmitting by an interrogator a first wireless command, specifying a first set of bit values to request one or more first replies from one or more radio frequency identification (RFID) devices that have a respective unique identifier containing a portion equal to the first set of bit values;*

*responsive to detecting a collision in the first replies, transmitting by the interrogator a second wireless command successively following the first wireless command, absent any intervening commands, and specifying a second set of bit values that include the first set of bit values and have at least two more bits than the first set of bit values, to request one or more second replies from one or more RFID devices that have a respective unique identifier containing a portion equal to the second set of bit values;*

*responsive to receiving a reply, without collision, from an RFID device of the one or more RFID devices, transmitting by the interrogator a third wireless command comprising a unique identifier of the RFID device to select the RFID device, the identifier including the second set of bit values;*

*identifying an account to be charged for payment based at least in part on the reply and the unique identifier of the RFID device; and*

*debiting funds of the identified account associated with the RFID device.*

*83. The method of claim 82, further comprising disposing the one or more RFID devices at least partly within a card.*

*84. The method of claim 82, further comprising disposing the one or more RFID devices within the housing of an object.*

*85. A wireless payment method, comprising:*

*transmitting a first command specifying a first bit sequence;*

*receiving a first response to the first command from an RFID device having a first portion of a unique identifier equal to the first bit sequence, the first response including at least a second portion of the unique identifier;*

*detecting that a collision has occurred with respect to the first response;*

*responsive to detecting that the collision has occurred, transmitting a second command following the first command in succession and absent any intervening commands, the second command specifying a second bit sequence that includes the first bit sequence and is at least two bits longer than the first bit sequence;*

*receiving a response to the second command from the RFID device indicating that the unique identifier includes the second bit sequence; and*

*receiving funds for the remote payment of goods or services based at least in part on the response to the second command received from the RFID device.*

*86. The method of claim of 85, further comprising disposing the one or more RFID devices at least partly within a card.*

*87. The method of claim of 86, wherein the card includes visual identification features including at least one of graphics and/or text.*

*88. The method of claim of 87, wherein the card further includes information typically found on a credit card.*

*89. A wireless payment method, comprising:*

*transmitting a first command specifying a first bit sequence;*

*receiving a first response to the first command from an RFID device having a first portion of a unique identifier equal to the first bit sequence, the first response including at least a second portion of the unique identifier;*

*detecting that a collision has occurred with respect to the first response;*

*responsive to detecting that the collision has occurred, transmitting a second command following the first command in succession and absent any intervening commands, the second command specifying a second bit sequence that includes the first bit sequence and is at least two bits longer than the first bit sequence;*

*receiving a response to the second command from the RFID device indicating that the unique identifier includes the second bit sequence;*

*determining an account of the RFID device based at least in part on the response to the second command received from the RFID device; and*

*causing the debiting of funds associated with the determined account.*

*90. The method of claim 89, further comprising disposing the RFID device at least partly within a card.*

*91. The method of claim 89, further comprising disposing the RFID device within the housing of an object.*

*92. The method of claim 89, wherein the debiting of funds is for the wireless payment of a toll.*

* * * * *